W. BECK.
Mold for the Manufacture of Hollow Blown
Ornamented Glassware.

No. 236,140.                    Patented Jan. 4, 1881.

Witnesses
Francis L. Chalk
Claudius L. Parker

Inventor Washington Beck,
By Attorney George H. Christy

UNITED STATES PATENT OFFICE.

WASHINGTON BECK, OF PITTSBURG, PENNSYLVANIA.

MOLD FOR THE MANUFACTURE OF HOLLOW BLOWN ORNAMENTED GLASSWARE.

SPECIFICATION forming part of Letters Patent No. 236,140, dated January 4, 1881.

Application filed March 5, 1878.

*To all whom it may concern:*

Be it known that I, WASHINGTON BECK, of Pittsburg, county of Allegheny, State of Pennsylvania, have invented or discovered a new and useful Improvement in Molds for the Manufacture of Hollow Blown Ornamented Glassware; and I do hereby declare the following to be a full, clear, concise, and exact description thereof, reference being had to the accompanying drawings, making a part of this specification, in which—like letters indicating like parts—

Figure 1:
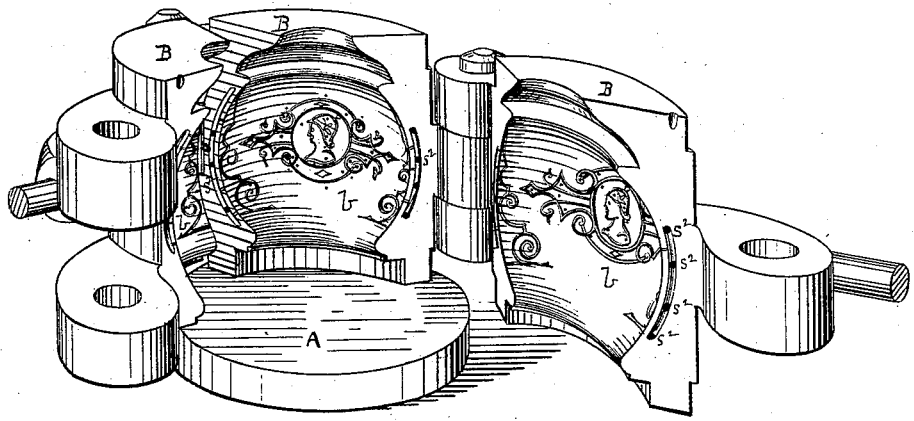
Figure 2:
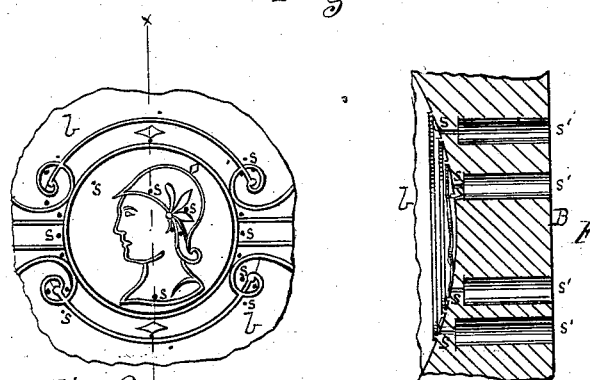
Figure 3:
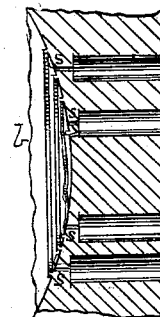
Figure 4:
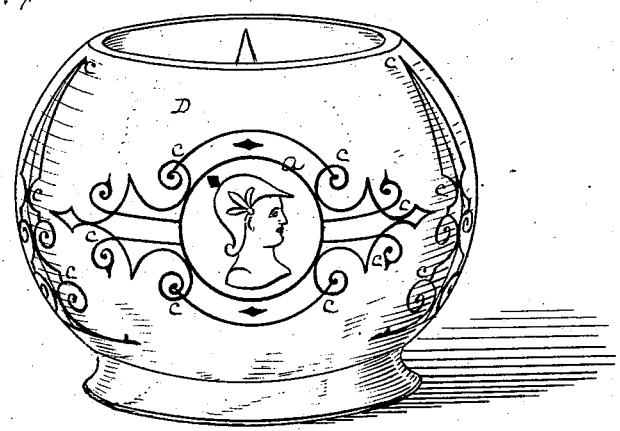

Figure 1 is an inside view, in perspective, of a three-part mold, illustrating one part of my invention, the mold being shown open. Fig. 2 is an enlarged face view of the central raised figure of one of the mold-sections of Fig. 1, intended more particularly to illustrate the manner of arranging and using vent-holes in the side walls of the mold. Fig. 3 further illustrates the same feature by a sectional view in the line $x\,x$ of Fig. 2; and Fig. 4 shows the product—viz., a blown glass globe having a depressed ornamentation formed by closed or meeting lines.

While the features of invention herein described and claimed may be applied, some or all of them, to other kindred articles of manufacture, the principal object I have in view, and the one I will explain in greater detail, is the manufacture of frosted glass globes or shades having a depressed ornamentation formed thereon by fine lines, which are straight or curved, broken or continuous, or which meet at one, two, or more points. The lines should be depressed, so that in frosting the surface or body of the globe or shade they will not be affected by the grinding operation, and after the frosting is done the designs will remain transparent, and thereby give the effect to the eye which is desired. In order to secure such depressed design on the globe or shade, the same design must be raised on the walls of the mold-cavity. Now, in blowing a glass globe or shade against such a raised design, particularly where the lines or ridges which form the design meet at two or more points, so as to inclose a space greater or less, it is obvious that the expanding film or wall of plastic glass will first come in contact with the summit or apex of the raised lines or ridges. In such case it has been found that more or less air is inclosed or confined between the film or wall of plastic glass and the wall of the mold-cavity, and which, unless an escape-vent is provided, is apt to prevent the film or wall of plastic glass from expanding outwardly and uniformly against the wall of the mold-cavity, and especially so at points near to or within such lines or ridges. This difficulty I overcome by making vent-holes in close proximity to such lines or ridges, such as will permit of the escape of the otherwise confined air, and thereby permit the wall or film of plastic glass to fill out into all the spaces near to or between the raised lines or ridges, and thereby give a depressed design in fine lines, sharp and well defined, which will be unaffected by the subsequent frosting of the main surface of the globe or shade.

In Fig. 1, A represents an ordinary base-plate, and B a three-part blowing-mold, having a cavity, when closed, of the proper form for blowing a glass globe, D, of any desired form. The mold may, however, be in two or four or more parts, as may be preferred.

A depressed design is desired on the outer face of the globe, either a single one or a duplicated design, and representing any desired figure, figure-head, or other ornamentation; and such figure, figure-head, or ornamentation may be secured by continuous lines, as at $a$, or by crooked lines intersecting or meeting at two or more points, as at $c$, or by other lines, straight, curved, or angular, or by a combination of some or all; but whatever style of design be adopted I raise the same, singly or duplicated, on the walls $b$ of the mold-cavity, a raised duplicated design being represented in Fig. 1. In Figs. 2 and 3 I have shown a portion of one form of such design in enlarged view, the better to show the air-vent or escape-holes $s$, of which at least one is made in each space bounded by such raised lines or ridges as inclose a space of the wall of the mold-cavity, and one at or near each other point where a vent may be deemed desirable. These vents are shown in Fig. 1 by dots, which I do not deem it necessary to letter in that figure. Where they open into the mold-cavity they should be large enough to permit of the escape of the confined air; or, if the space is large, two or more such vents may be made in each inclosed space or near each line which needs venting; but they should be so small that the plastic or semi-plastic glass cannot flow or be blown into them. For most purposes a diameter of about one thirty-second of an inch will suffice; but, on account of the difficulty of drilling so small a hole of any considerable length, I drill the outer ends, $s'$, of the holes larger to within a short distance of the mold-cavity, and then drill the small holes $s$ through the rest of the way; but where such vent-holes come near the edge or line of division of the molds the enlarged parts of the holes may be extended to such edge or division, as at $s^2$, instead of directly through. The blowing is done in the usual or any known way.

The raised lines or ridges forming the design on the walls of the mold-cavity give a correspondingly depressed design in the product. As the air, which might otherwise be inclosed, is free to escape, the blower can force outward those parts of the glass which come inside or near the raised lines or ridges, so that in the product as blown those parts will have the same curvature, swell, or bulge as the parts outside of or more remote from such lines. Hence all parts will be uniformly acted on in the frosting operation, which follows in the order well known in the art, and the depression of the design will prevent its being acted on by the grinding operation, so that it will remain transparent.

The same features of novelty may be employed in blowing glass shades and other kindred articles, such as glass lamp-chimneys, combined globes and chimneys, lamp-bowls, and hollow blown glassware generally.

In working this improvement the raised ridges which give the design should, by preference, be rectangular, or nearly so, as more fully shown in Fig. 3, instead of tapering, as a better marked design can be thus secured in the product; but a tapering ridge can be used, if so preferred. In so far as relates to the use of the mold described with a raised design and vented spaces or surfaces, the invention may be employed without frosting—as, for example, by using colored or opal glass—in which case the design will be brought out with fine effect in the product by the depressions produced in blowing.

I am aware that it is not new to form depressed vented figures, patterns, or letters in a mold, and that pressed glassware having elevated figures or designs has been made to give a somewhat ornamental effect by grinding such raised figures, patterns, or designs; but such operation is the reverse of that hereinbefore described, and gives a radically different style or system of ornamentation, and also is not adapted to give the result which I principally have in view, which is to get a style of depressed ornamentation so fine in its lines or delineations that a brush may be used for grinding purposes without necessarily protecting the lines forming the design as against the action of the brush. In general terms the operation disclaimed produces effects somewhat akin to that of painting, while that herein described more resembles the effects of the art of engraving.

I claim herein as my invention—

1. A mold having a figure or figures or pattern formed on its interior surface in raised continuous, broken, or intersecting lines, substantially as described.

2. A mold having a figure or figures or pattern formed on its interior surface in raised continuous, broken, or intersecting lines, and vented by a series of fine orifices at or near the angles formed by the raised-line pattern and interior surface of the mold, said mold being adapted to produce an article having a design in fine depressed lines, substantially as and for the purpose specified.

In testimony whereof I have hereunto set my hand.

WASHINGTON BECK.

Witnesses:
J. J. McCORMICK,
CLAUDIUS L. PARKER.